(12) United States Patent
Oki

(10) Patent No.: US 7,228,491 B2
(45) Date of Patent: Jun. 5, 2007

(54) SIGNAL PROCESSING DEVICE AND SIGNAL PROCESSING METHOD

(75) Inventor: Noboru Oki, Saitama (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 480 days.

(21) Appl. No.: 10/739,985

(22) Filed: Dec. 17, 2003

(65) Prior Publication Data

US 2004/0133842 A1 Jul. 8, 2004

(30) Foreign Application Priority Data

Dec. 18, 2002 (JP) .............................. P2002-367195

(51) Int. Cl.
*H03M 13/03* (2006.01)

(52) U.S. Cl. ...................... 714/794; 714/795; 714/792; 714/796; 375/341; 375/262; 375/265

(58) Field of Classification Search ........ 714/794–796, 714/791–792; 375/265, 262, 341
See application file for complete search history.

(56) References Cited

U.S. PATENT DOCUMENTS 6,795,511 B1 * 9/2004 Hansen ....................... 375/265

FOREIGN PATENT DOCUMENTS

| EP | 0 763 902 A1 | 3/1997 |
|---|---|---|
| EP | 1 187 343 A2 | 3/2002 |
| EP | 1 207 659 A2 | 5/2002 |
| JP | 08-149567 | 6/1996 |
| JP | 2002-076923 | 3/2002 |
| WO | WO/97/05717 | 2/1997 |

* cited by examiner

*Primary Examiner*—Guy J. Lamarre
(74) *Attorney, Agent, or Firm*—Bell, Boyd & Lloyd LLP

(57) ABSTRACT

A signal processing device and method are provided. The signal processing device and method perform maximum-likelihood decoding of data transmitted at an arbitrary data rate among a plurality of predetermined data rates after error detection coding and error correction coding.

2 Claims, 9 Drawing Sheets

SIGNAL PROCESSING DEVICE AND SIGNAL PROCESSING METHOD

CROSS REFERENCE TO RELATED APPLICATIONS

This application is a priority application of Japanese Patent Application No. P2002-367195, filed Dec. 18, 2002, the disclosure of which is herein incorporated by reference.

BACKGROUND OF THE INVENTION

The invention relates to a signal processing device and a signal processing method which perform maximum likelihood decoding of convolutionally coded data, and in particular to a signal processing device and a signal processing method which detect the data rate of transmitted data.

In the prior art, data is transmitted at a predetermined data rate among a plurality of prepared data rates, and the data rate has been detected on the receiving side. FIG. 1 shows an example of configuration of a communication system which transmits and receives data at an arbitrary data rate among a plurality of predetermined data rates, and which includes a conventional reception device 3.

The transmission device 1 transmits convolutionally coded data at an arbitrary data rate among a plurality of predetermined data rates to the reception device 3, via the communication path 2.

FIG. 2 shows an example of the transport format of data here being transmitted and received. In this format, a CRC (Cyclic Redundancy Check) code is appended to the data stream; however because the length of the data stream varies according to the data rate, the tail bit (final bit of the CRC) $n_{end}$ differs depending on the data rate. In the following explanation, the final bit of the CRC shall be called the tail bit $n_{end}$.

For example, when as shown in FIG. 2 there exist four data rates R1, R2, R3, R4 (where data rate R1<data rate R2<data rate R3<data rate R4), the tail bits $n_{end}$ for each of the data rates R1 to R4 become the E1st bit ((a) in FIG. 2), the E2nd bit ((b) in FIG. 2), the E3rd bit ((c) in FIG. 2), or the E4th bit ((d) in FIG. 2), counting from the leading bit S.

The interval from the E1st, E2nd and E3rd bits which are the tail bits $n_{end}$ for data rates R1 to R3 in transport formats at the data rates R1 to R3, until the bit equivalent to the E4th bit which is the tail bit $n_{end}$ for data rate R4, is an empty interval containing no data.

The reception device 3 performs Viterbi decoding of data (FIG. 2) transmitted from the transmission device 1 via the communication path 2. The reception device 3 also detects the data rate of the received data, and outputs decoded data, at the detected data rate, to a data processing device (not shown) connected to the reception device.

Next, the configuration of the transmission device 1 and reception device 3 shown in FIG. 1 is explained.

The transmission device 1 has a CRC (Cyclic Redundancy Check) encoder 11, convolutional coding portion 12, and modulation portion 13. The CRC encoder 11 appends to the data stream a CRC parity bit for data to be transmitted, and supplies the result to the convolutional coding portion 12.

The convolutional coding portion 12 performs convolutional coding of the data from the CRC encoder 11, and supplies the result to the modulation portion 13. The modulation portion 13 modulates the data from the convolutional coding portion 12, and transmits the result to the reception device 3 via the communication path 2.

The reception device 3 has a demodulation portion 31, Viterbi decoding portion 32, CRC decoder 33, and data rate detection portion 34. The demodulation portion 31 demodulates the received data, and supplies the result to the Viterbi decoding portion 32.

The Viterbi decoding portion 32 is controlled by the data rate detection portion 34, and performs Viterbi decoding of data from the demodulation portion 31, supplying the data thus obtained (decoded data) to the CRC decoder 33.

The Viterbi decoding portion 32 supplies to the data rate detection portion 34 the maximum path metric, minimum path metric, and zero-state path metric calculated at this time.

The Viterbi decoding portion 32 outputs the decoded data obtained as a result of Viterbi decoding to a device, not shown, at the data rate detected by the data rate detection portion 34.

The CRC decoding portion 33 is controlled by the data rate detection portion 34, and performs a CRC check of the data from the Viterbi decoding portion 32, supplying the check result to the data rate detection portion 34.

The data rate detection portion 34 controls the Viterbi decoding portion 32 and CRC decoder 33, causing Viterbi decoding and CRC checks to be performed, and also detects the data rate of the received data based on the maximum path metric, minimum path metric and zero-state path metric, as well as the CRC check result from the CRC decoder 33.

Next, the operation of the reception device 3 which detects the data rate of received data is explained, referring to the flowchart of FIG. 3. Here it is assumed that, as in FIG. 2, there exist four data rates Ri (i=1, 2, 3, 4).

In step S1, the data rate detection portion 34 sets the initial values of the internal counter i to 1, of the register Smin to a predetermined value D, and of the register Tr to 0.

In step S2, the data rate detection portion 34 controls the Viterbi decoding portion 32 to compute the maximum path matrix, minimum path metric, and zero-state path metric from the leading bit S up to the tail bit $n_{end}$ for the data rate Ri identified using the value of the counter i.

By this means, the Viterbi decoding portion 32 executes so-called ACS (Add-Compare-Select) processing to add, compare, and select values, and computes values of the maximum path metric, minimum path metric, and zero-state path metric. The Viterbi decoding portion 32 supplies the computed data to the data rate detection portion 34.

The reception device 3 (data rate detection portion 34) identifies in advance the possible data rates Ri, and can identify the data rate Ri based on the value of the counter i.

In this example, when the value of the counter i is 1, 2, 3, or 4 (the maximum value) (i=1, 2, 3, 4), the data rates R1, R2, R3, R4 are respectively identified, and the maximum path metric, minimum path metric, and zero-state path metric from the leading bit S to the E1st bit ((a) in FIG. 2), E2nd bit ((b) in FIG. 2), E3rd bit ((c) in FIG. 2), or E4th bit ((d) in FIG. 2) are computed.

Next, in step S3 the data rate detection portion 34 employs equation (1) to compute the S value based on the values for the maximum path metric, minimum path metric, and zero-state path metric supplied by the Viterbi decoding portion 32 in step S2.

$$S \text{ value}=10 \text{ Log}((a_0-a_{min})/(a_{max}-a_{min})) \tag{1}$$

In the equation, $a_{max}$ is the maximum path metric, $a_{min}$ is the minimum path metric, and $a_0$ is the zero-state path metric. The maximum value of S is 0, and the minimum value is negative infinity.

In step S4, the data rate detection portion 34 judges whether the value of S computed in step S3 is or is not less than or equal to the threshold D.

When the data rate Ri identified through the value of the counter i is the true data rate of the received data, the zero-state path metric calculated by the Viterbi decoding portion 32 is a sufficiently small value, so that the value of S indicated by equation (1) is a small value. If on the other hand the data rate Ri is not the true data rate of the received data, the zero-state path metric calculated will not be a value that is sufficiently small, so that the value of S will not be a small value. In other words, by judging whether or not the calculated value of S is less than or equal to the threshold D, it is possible to decide whether the data rate Ri identified using the value of the counter i can be regarded as the true data rate of the received data (whether it is possible that the data rate is the true data rate).

The threshold D is a comparatively large value, so that the S value for the true data rate is not judged to be larger than the threshold D.

In step S4, when the S value is judged to be equal to or less than the threshold D, that is, when the data rate Ri identified from the value of the counter i can be considered to be the true data rate for the received data (when there is the possibility that the data rate is the true data rate), processing proceeds to step S5.

In step S5, the data rate detection portion 34 controls the Viterbi decoding portion 32 to cause execution of traceback processing, and generates the data stream up to the tail bit $n_{end}$ for the data rate Ri identified by the value of the counter i (for example, if the value of the counter i is 1, the E1st bit). Further, in step S6, the data rate detection portion 34 controls the CRC decoder 33 to cause a CRC check of the data thus generated to be performed.

By this means, the Viterbi decoding portion 32 generates the data stream from the leading bit S to the tail bit $n_{end}$ for the data rate Ri, and supplies the data stream to the CRC decoder 33.

The CRC decoder 33 divides the decoded data supplied by the Viterbi decoding portion 32 (the decoded data from the leading data bit S to the tail bit $n_{end}$ for the data rate Ri) by a generator polynomial, and determines the remainder.

When the data rate Ri identified by the value of the counter i is the true data rate of the received data, there is a strong possibility that the remainder thus determined is 0; and when the data rate Ri is not the true data rate of the received data, there is a strong possibility that the remainder is not 0.

The CRC decoder 33 notifies the data rate detection portion 34 of the remainder thus determined, as the CRC calculation result.

In step S7, the data rate detection portion 34 judges whether or not an error exists in the received data, based on the CRC calculation result from the CRC decoder 33. That is, a judgment is made as to whether there exists an error in the received data, based on CRC calculation results for the case in which the data rate of the received data is the data rate Ri indicated by the value of the counter i at that time. If the CRC calculation result is not 0 (if the data rate Ri is not the true data rate), it is judged that an error exists, and if the CRC calculation result is 0 (if there is the possibility that the data rate is the true data rate), it is judged that an error does not exist.

When in step S7 it is judged that an error does not exist, processing proceeds to step S8, and the data rate detection portion 34 judges whether or not the value S calculated in step S3 is equal to or less than the value of the register Smin.

The value D is initially set as the register Smin, so that an S value initially resulting in a "YES" judgment in step S4 will of course be equal to or less than the value of the register Smin.

In step S8, when the value of S is judged to be equal to or less than the value of the register Smin, processing proceeds to step S9, and the data rate detection portion 34 replaces the value of the register Smin with the currently calculated value of S. In other words, the judgment of step S8 is a judgment of whether the currently calculated value of S is the smallest among the values of S calculated thus far.

The data rate detection portion 34 also replaces the value of the register Tr with the current value of the counter i.

When in step S4 it is judged that the value of S is not less than or equal to the threshold D, or when in step S7 an error is judged to exist, or when in step S8 the value of S is judged not to be less than or equal to the value of the register Smin, or when in step S9 the values of the register Smin and of the register Tr are interchanged, processing proceeds to step S10.

In step S10, the data rate detection portion 34 judges whether the value of the counter i is the maximum value (4), and if judged not to be the maximum value, processing proceeds to step S11, the value of the counter i is incremented by 1, processing returns to step S2, and subsequent processing is executed.

When in step S10 the value of the counter i is judged to be the maximum value, processing proceeds to step S12, and the data rate detection portion 34 detects the data rate Ri identified by the value of the register Tr as the true data rate of the received data. The data rate detection portion 34 controls the Viterbi decoding portion 32 to cause decoded data to be output at the detected data rate Ri. Then, processing ends.

In Japanese Patent Laid-open No. 2002-76923, the data rate detection processing heretofore explained is described.

In this way, detection of the rate of received data is performed when the rate is variable; in this case, if the above-described equation (1) is used to compute the value of S, because computations employ logarithms and division, the volume of calculations is large, and when for example implemented in hardware, there is the problem that the scale of circuitry and power consumption both become large.

SUMMARY OF THE INVENTION

The present invention provides performing detection of the rate of received data through simple processing.

In a signal processing device that performs maximum likelihood decoding of data transmitted at an arbitrary data rate among a plurality of predetermined data rates after performing error detection coding and error correction coding, the signal processing device of this invention in an embodiment includes: normalization means for calculating the average value of received data and for utilizing the average value thus calculated to normalize the received data; maximum likelihood decoding means for selecting a plurality of data items in a predetermined order from among the output of the normalization means and performing maximum likelihood decoding processing, considering the rate of the data to be the selected data rate; computation means for subtracting the smallest metric value from among predetermined metric values obtained in the maximum likelihood decoding processing; judgment means for judging the correct data rate, based on metric values at state 0 for each rate obtained as a result of computations by the computation means and on error detection results; and output means for output of decoded data at the rate judged by the judgment means.

In a signal processing method in which maximum likelihood decoding is performed on data transmitted at an arbitrary data rate among a plurality of predetermined data rates after performing error detection coding and error correction coding, the signal processing method of this invention includes in an embodiment the steps of: calculating the average value of received data and utilizing the average value thus calculated to normalize the received data; selecting a plurality of data items in a predetermined order from among the output of the normalization step and performing maximum likelihood decoding processing, considering the rate of the data to be the selected data rate; subtracting the smallest metric value from among predetermined metric values obtained in the step of maximum likelihood decoding processing; judging the correct data rate, based on metric values at state 0 for each rate obtained as a result of subtracting step and on error detection results; and outputting decoded data at the rate judged by the judging step.

In this way, the amount of calculations necessary for data rate detection processing can be reduced.

In an embodiment, a signal processing device includes a normalizer which, when data transmitted at an arbitrary data rate after error detection coding and error correction coding is subjected to maximum-likelihood decoding, calculates the average value of the received data, and uses the calculated average value to normalize the received data; a maximum-likelihood decoder which selects in a predetermined order a plurality of data items from among the output of the normalizer, and performs maximum-likelihood decoding, considering the rate of the data to be a selected data rate; a computing element which subtracts, from predetermined metrics obtained by maximum-likelihood decoding, the smallest metric thereamong; a judging element which judges the correct data rate, based on the state 0 metrics at each rate obtained from computation results of the computation element; and an output element which outputs the decoded data at the rate judged by the judging element to be the correct rate.

Additional features and advantages of the present invention are described in, and will be apparent from, the following Detailed Description of the Invention and the figures.

DETAILED DESCRIPTION OF THE INVENTION

The invention relates to a signal processing device and a signal processing method which perform maximum likelihood decoding of convolutionally coded data, and in particular to a signal processing device and a signal processing method which detect the data rate of transmitted data.

Figure 1:
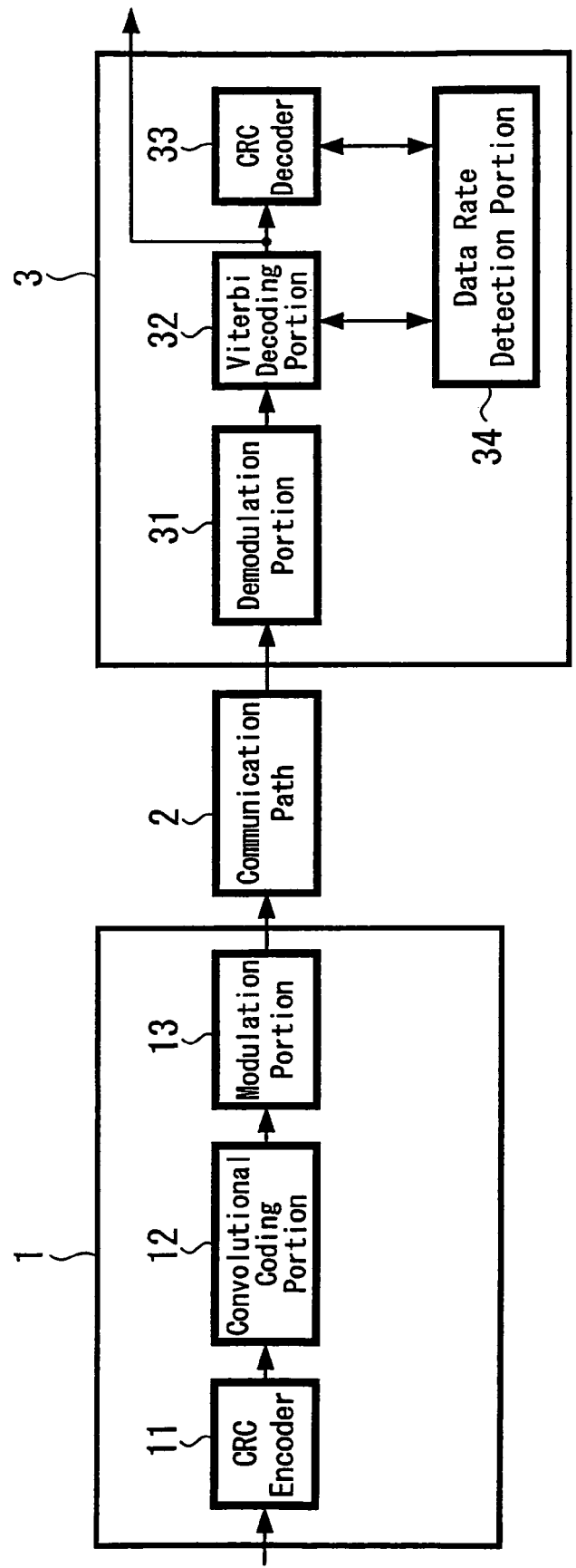
FIG. 1 is a block diagram showing an example of a conventional configuration.

Hereinafter, referring to FIGS. 4 through 10 an embodiment of the present invention is explained. In FIGS. 4 through 10 explaining the embodiment, components corresponding to those in FIGS. 1 through 3 explaining an example of the prior art are assigned the same symbols.

Figure 2:
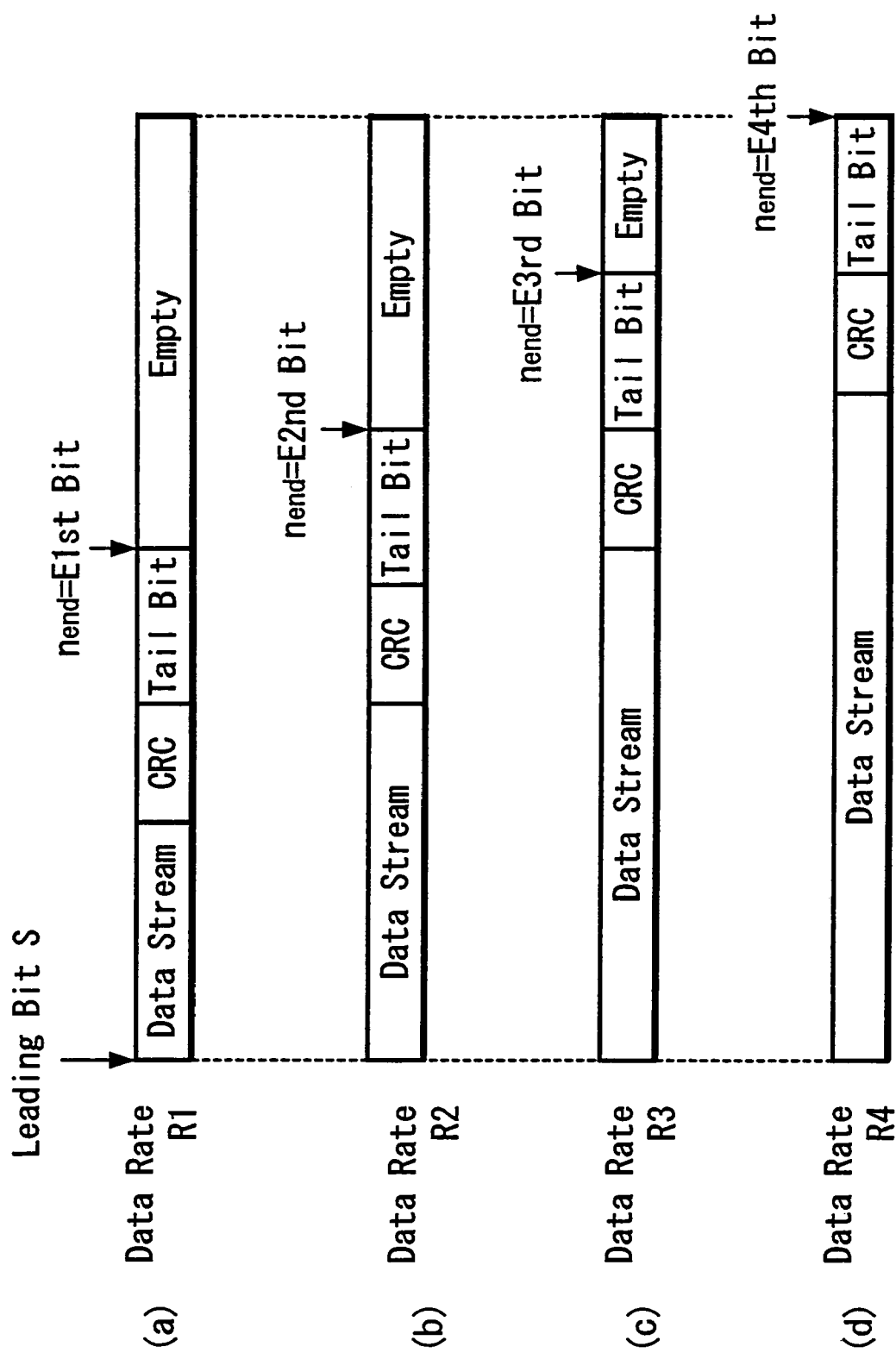
FIG. 2 is an explanatory drawing showing examples of data rates.
Figure 3:
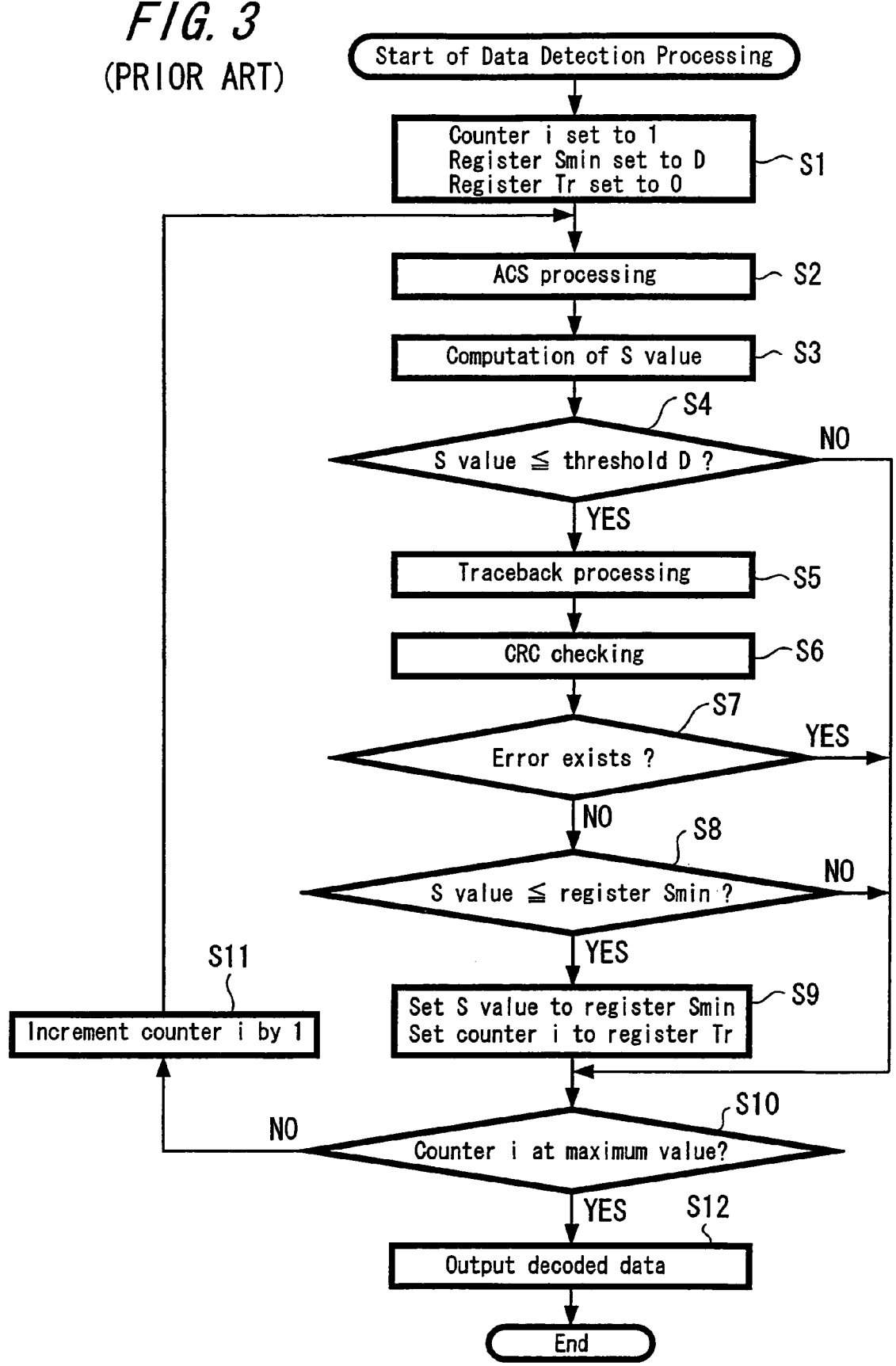
FIG. 3 is a flowchart showing an example of conventional data rate detection processing.

In this embodiment, similarly to a system explained as an example of the prior art, the invention is applied to a communication system in which convolutionally coded data is transmitted and received at an arbitrary data rate among a plurality of predetermined data rates. That is, in this embodiment a data format is used in which there exist four data rates, R1, R2, R3 and R4 (where data rate R1<data rate R2<data rate R3<data rate R4), for which the respective positions of the tail bit $n_{end}$ are the E1st bit ((a) in FIG. 2), the E2nd bit ((b) in FIG. 2), the E3rd bit ((c) in FIG. 2), or the E4th bit ((d) in FIG. 2), counting from the leading bit S, as shown in FIG. 2.

Figure 4:
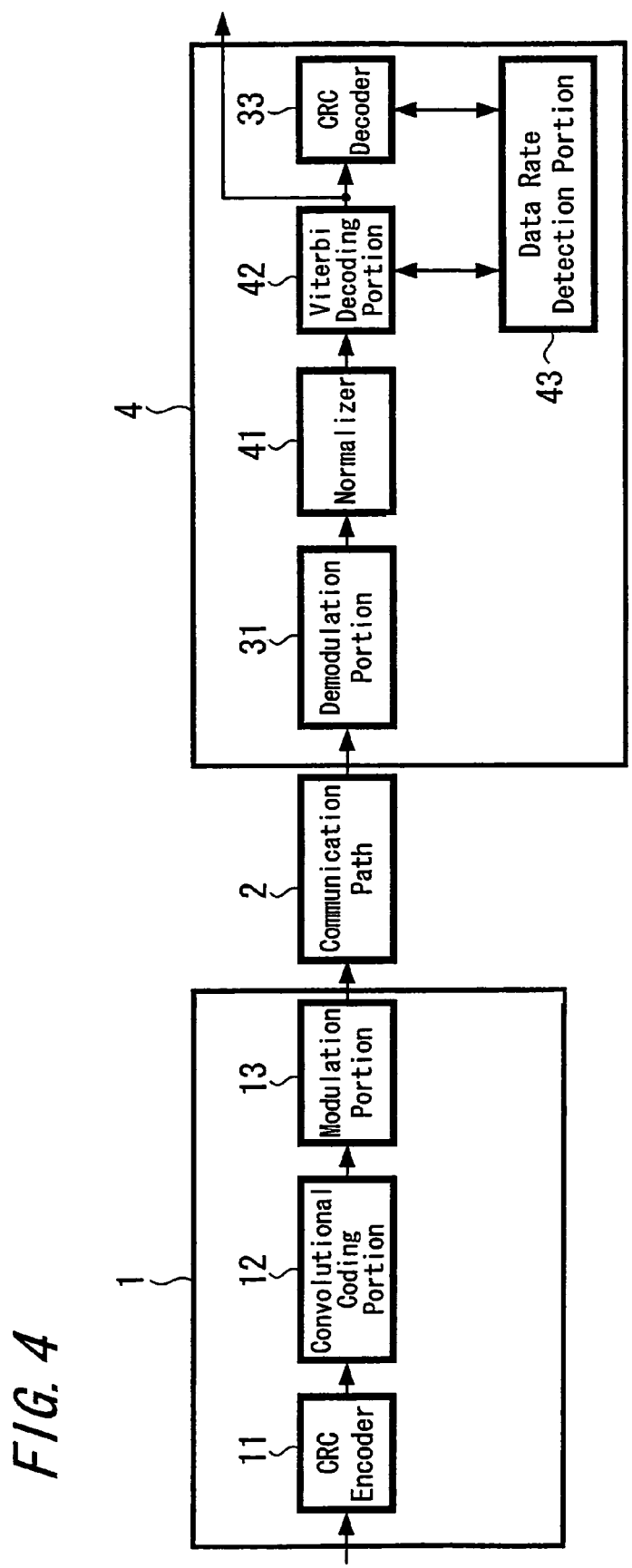
FIG. 4 is a block diagram showing an example of the configuration according to an embodiment of the present invention.

FIG. 4 is a block diagram showing an example of the configuration of a communication system, including the reception device 4 of this embodiment. The configuration on the side of the transmission device 1 is the same as the configuration explained in the example of the prior art. That is, the transmission device 1 transmits convolutionally coded data to the reception device 4 via the communication path 2, at an arbitrary data rate among a plurality of predetermined data rates.

The transmission device 1 has a CRC (Cyclic Redundancy Check) encoder 11, a convolutional coding portion 12, and a modulation portion 13. The CRC encoder 11 appends to the data stream a CRC parity bit for the data to be transmitted, and supplies the result to the convolutional coding portion 12.

The convolutional coding portion 12 performs convolutional coding of the data from the CRC encoder 11, and supplies the result to the modulation portion 13. The modulation portion 13 modulates the data from the convolutional coding portion 12, and transmits the result to the reception device 4, via the communication path 2.

The reception device 4 performs Viterbi decoding processing of data transmitted from the transmission device 1 via the communication path 2. The reception device 4 also detects the data rate of the received data, and outputs the decoded data to a data processing device (not shown) connected to the reception device at the detected data rate.

The reception device 4 is configured including: a demodulation portion 31; normalizer 41 to normalize signals demodulated by the demodulation portion 31; Viterbi decoding portion 42 to perform Viterbi decoding of the output of the normalizer 41; CRC decoder 33 to perform CRC decoding of data output by the Viterbi decoding portion 42; and data rate detection portion 43 to detect the data rate of the received data.

The demodulation portion 31 demodulates received data and supplies the result to the normalizer 41. In the normalization processing of the normalizer 41, the average value of the received data is calculated, and this calculated average value is used to normalize the received data. Specifically, the average value of the absolute values of data from, for example, the leading bit S until the tail bit $n_{end}$ that is the shortest data length at the data rate is calculated. Each of the input data items is divided by the calculated average values, and the result is further multiplied by an appropriate constant A. By performing such normalizing processing, with respect to the output data of the normalizer 41 the average value of the data in decoding processing units is normalized by A, even if there is fluctuation in the received signal level.

Demodulated data which has been normalized by the normalizer 41 is then Viterbi-decoded by the Viterbi decoding portion 42.

Figure 5:
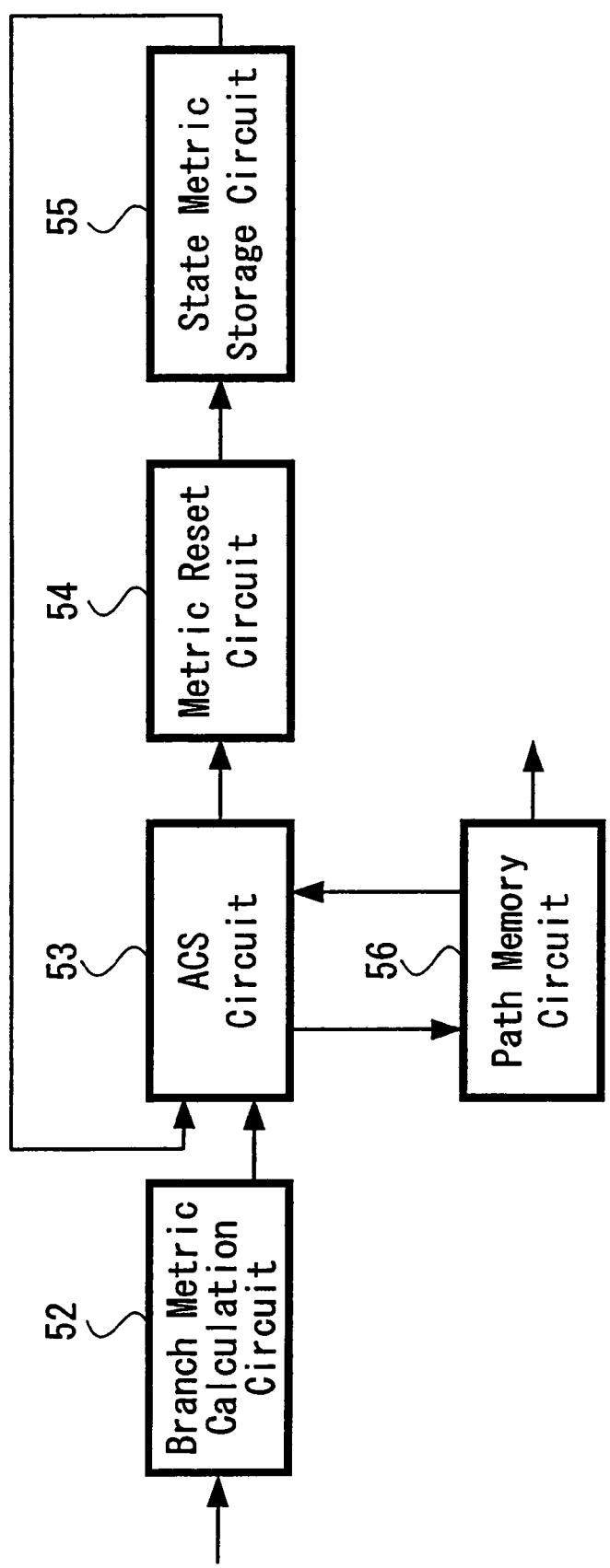
FIG. 5 is a block diagram showing an example of the configuration of the Viterbi decoding portion according to an embodiment of the present invention.

FIG. 5 shows an example of the configuration of the Viterbi decoding portion 42. Data input to the Viterbi decoding portion 42 is supplied to a branch metric calculation circuit 52, and the metric for each branch is calculated by the branch metric calculation circuit 52.

The branch metrics output by the branch metric calculation circuit 52, and the path metrics for each state stored in a state metric storage circuit 55, are supplied to an ACS circuit 53, added and compared. The path metrics for each state obtained by addition and comparison in the ACS circuit 53 are used by a metric reset circuit 54 to search for the minimum path metric, and the minimum path metric thus found is used to be subtracted from path metrics for each state in normalization computation processing, to reset the path metric for each state. By performing such reset processing, the minimum path metric is always 0.

The path metrics for each state output by the reset circuit 54 are stored in the metric storage circuit 55 and are supplied to the ACS circuit 53. Path selection information in the ACS circuit 53 is stored in a path memory circuit 56.

In the ACS circuit 53, branch metrics and path metrics are added and compared for each of two paths merging in each state, based on the branch metrics supplied by the branch metric calculation circuit 52 and on the path metrics for each state stored in the metric storage circuit 55; based on the comparison results, metrics with the highest likelihood are selected, and are taken to be the new path metrics for each state. The details of the selection are supplied as path selection information to the path memory circuit 56, and the state number of the minimum metric is supplied as maximum-likelihood state information to the path memory circuit 56. The path memory circuit 56 stores path selection information output by the ACS circuit 53, and at the same time based on the maximum-likelihood state information output by the ACS circuit 53, outputs as decoded data the information, among the information corresponding to the maximum-likelihood path, until a specific length called the truncation length.

Figure 6:
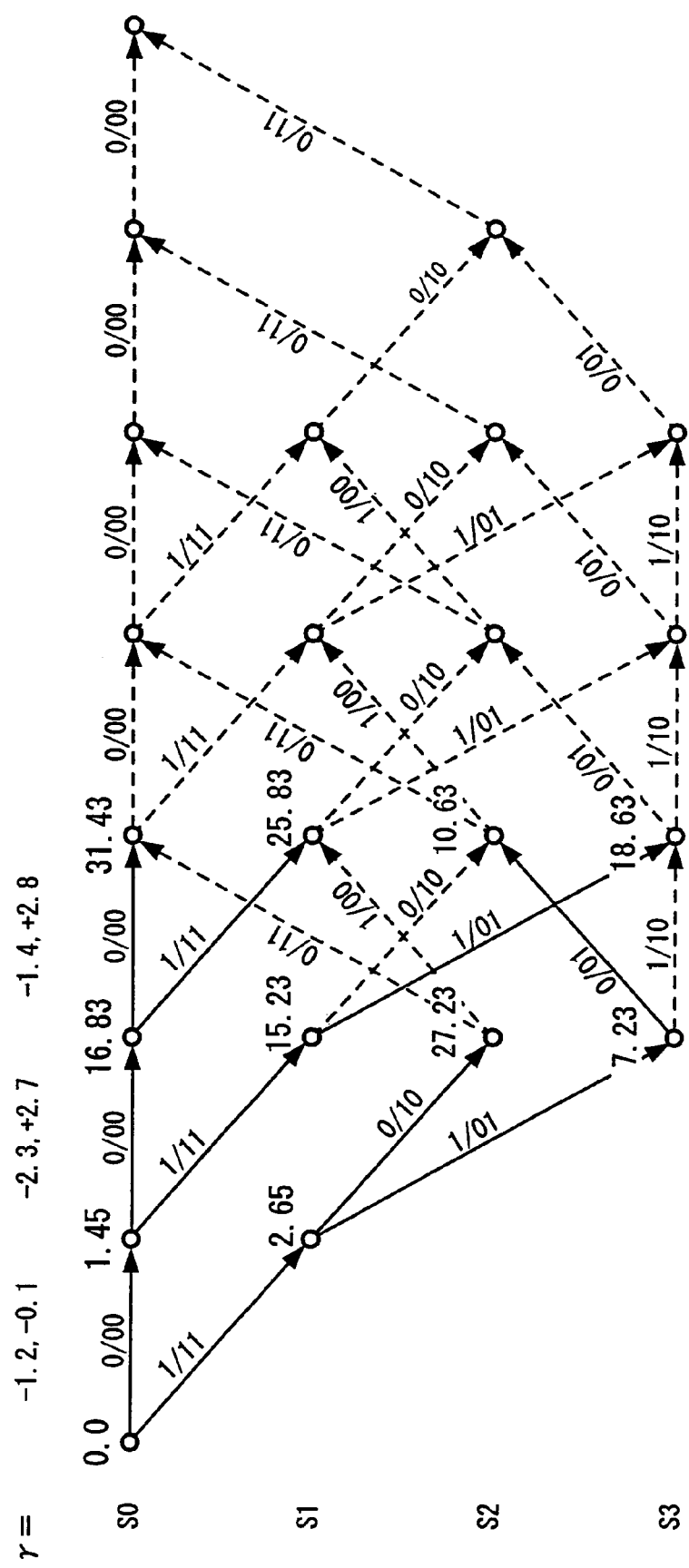
FIG. 6 is a drawing explaining an example of a decoding trellis in Viterbi decoding.

An example of a specific path selection processing state is shown in the trellis of FIG. 6; if for example there exist four states S0, S1, S2, S3, there exist, for each time slot, two merging paths for all states. For each of the two paths merging into a given state, the Hamming distance (branch metric) between the received signal and the path, and the cumulative sum of branch metrics up to that time (state path metrics), are added and compared by the ACS circuit 53, and based on the comparison result, the path of highest likelihood is selected. The metric values of each of the states S0 to S3 are added cumulatively as shown in FIG. 6, and gradually a large value is obtained; by traversing the path with the smallest value in order, the path of maximum likelihood can be selected, and accurate decoding can be performed.

In the case of this embodiment, as explained above, the minimum path metric is sought by the metric reset circuit 54, and by subtracting the minimum path metric value thus found from the path metrics for each state, there is no cumulative addition of the values of path metrics. FIG. 6 is a trellis illustrating the principle of path selection; as the metric for each state, the state is shown in which processing to subtract the mininum value is not performed at that time. Hence in the case of the example of FIG. 6, metrics are shown in a state of cumulative addition, however as already explained, by performing the computation processing of this embodiment, the smallest value among the four states is 0.

In this way, as Viterbi decoding processing in the Viterbi decoding portion 42 (FIG. 4) of this embodiment, the smallest path metric is sought from the path metrics for each state obtained after the ACS (Add-Compare-Select) computations which add, compare, and select upon decoding at every step, and this minimum value is subtracted from the path metrics for each state. As a result, when computing the path metric through ACS computations in order from the leading bit, increases in the absolute value of the path metric can be avoided. That is, whatever the tail bit $n_{end}$, there are no longer large differences in the maximum metrics (the value of $(a_{max}-a_{min})$ in equation (1)) after subtraction of the minimum metric.

Thus in the reception device 4 of this embodiment, through normalization by the normalizer 41 and subtraction of the minimum path metric by the Viterbi decoding portion 42, there are no longer large differences in the $(a_{max}-a_{min})$ of equation (1) for various communication path environments, and regardless of the tail bit $n_{end}$. Hence in comparisons of S values and D values, or of S values for different tail bits $n_{end}$, there is no longer a need to consider $(a_{max}-a_{min})$. Further, the logarithm applied to equation (1) is a simple increasing function, and ultimately the S value can be considered to be the zero-state path metric value $a_{0'}$ ($=a_0-a_{min}$) after subtraction of the minimum metric value.

Hence in the reception device 4 of this embodiment, only the zero-state path metric $a_{0'}$ is supplied to the data rate detection portion 43. By the data rate detection portion 43, the Viterbi decoding portion 42 and CRC decoder 33 are controlled to and made to perform Viterbi decoding and CRC checking, and based on the zero-state path metric $a_{0'}$ from the Viterbi decoding portion 42 and the result of CRC checking by the CRC decoder 33, processing is performed to detect the data rate of the received data.

Figure 7:
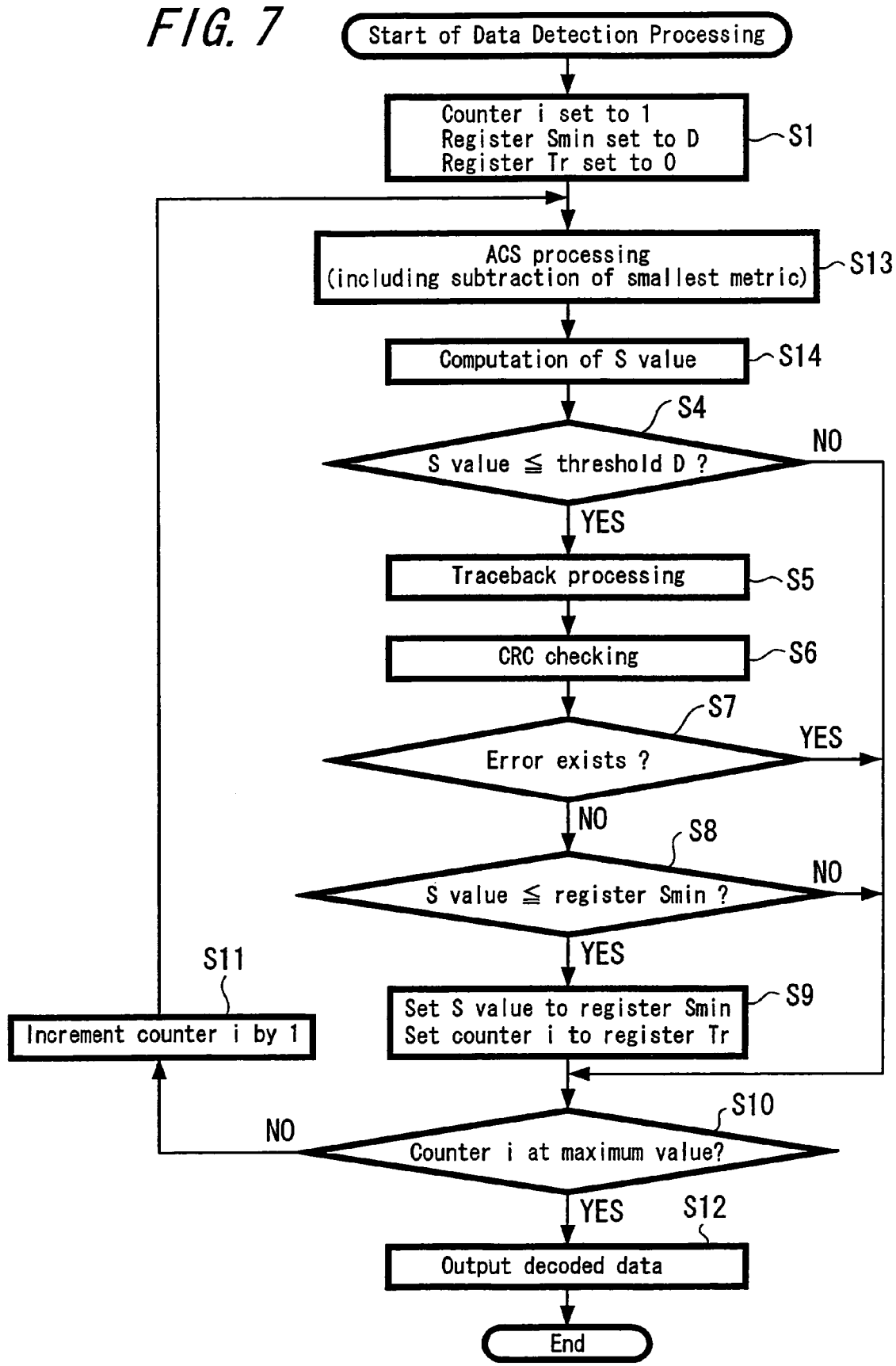
FIG. 7 is a flowchart showing an example of data rate detection processing according to an embodiment of the present invention.

Next, data rate detection processing for received data in the reception device 4 of this embodiment is explained, referring to the flowchart of FIG. 7. In the flowchart of FIG. 7, steps in which the same processing is performed as in the flowchart of FIG. 3 explaining a conventional example are assigned the same step numbers. In this example also, as shown in FIG. 2, it is assumed that there exist four data rates Ri (i=1, 2, 3, 4).

In step S1, the data rate detection portion 43 sets the initial values of the counter i to 1, of the value of the register Smin to the predetermined value D, and of the value of the register Tr to 0.

In step S13, the Viterbi decoding portion 42 executes in sequence the ACS processing already described, involving addition, comparison and selection of data normalized by the normalizer 41, and seeks the smallest path metric among the path metric values for each state obtained after ACS processing; this value is subtracted from the path metric values for each state. Further, the Viterbi decoding portion 42 is controlled by the data rate detection portion 43, and supplies to the data rate detection portion 43 the zero-state path metric $a_{0'}$ at the tail bit $n_{end}$ for the data rate Ri identified by the value of the counter i.

The data rate detection portion 43 within the reception device 4 identifies in advance all possible data rates Ri, and is able to recognize the data rate Ri based on the value of the counter i.

In this embodiment, when the value of the counter i is 1, 2, 3 or 4 (the maximum value) (i=1, 2, 3, 4), the data rates R1, R2, R3, R4 respectively are recognized, and the values of the maximum path metric, minimum path metric, and zero-state path metric are calculated for data from the leading bit S until the E1st bit ((a) in FIG. 2), the E2nd bit ((b) in FIG. 2), the E3rd bit ((c) in FIG. 2), or the E4th bit ((d) in FIG. 2), respectively.

Next, in step S14 the data rate detection portion 43 computes the following equation to calculate the S value, based on the zero-state path metric $a_{0'}$ supplied by the Viterbi decoding portion 42 in step S13.

$$S\ value = a_{0'} \qquad (2)$$

That is, in this embodiment the S value is the value of $a_{0'}$ itself supplied by the Viterbi decoding portion 42. Using this S value, the subsequent processing is performed. The subsequent processing steps are the same as the processing steps explained in the example of the prior art; however, the explanation is here repeated. In step S4, the data rate detection portion 43 judges whether or not the S value computed in step S14 is equal to or less than the threshold D.

When the data rate Ri identified by the value of the counter i is the true data rate of the received data, the zero-state path metric calculated by the Viterbi decoding portion 42 at this time will be sufficiently small, and so the S value indicated by equation (2) will be a small value. On the other hand, if the data rate Ri is not the true data rate of the received data, the zero-state path metric calculated at this time will not be a small value, and so the S value will not be a small value. That is, by judging whether or not the computed S value is equal to or less than the threshold D, it is possible to judge whether or not the data rate Ri identified by the value of the counter i is the true data rate of the received data (whether it is possible that the data rate is the true data rate).

The threshold D is set to a comparatively large value, such that the S value for the true data rate is not judged to be larger than the threshold D.

In step S4, when the S value is judged to be equal to or less than the threshold D, that is, when the data rate Ri identified by the value of the counter i at this time can be regarded as the true data rate of the received data (when there is the possibility that the data rate is the true data rate), processing proceeds to step S5.

In step S5, the data rate detection portion 43 controls the Viterbi decoding portion 42 to cause traceback processing to be executed, to generate the data stream from the leading bit S until the tail bit $n_{end}$ for the data rate Ri identified by the value of the counter i (for example, when the value of the counter i is 1, the E1st bit). Then, in step S6, the data rate detection portion 43 controls the CRC decoder 33 to cause a CRC check of the data generated to be performed.

By this means, the Viterbi decoding portion 42 generates the data stream from the leading bit S until the tail bit $n_{end}$ for the data rate Ri, and supplies the result to the CRC decoder 33.

The CRC decoder 33 divides the decoded data supplied by the Viterbi decoding portion 42 (the decoded data from the leading data bit S to the tail bit $n_{end}$ for the data rate Ri) by a generator polynomial, and determines the remainder.

When the data rate Ri identified by the value of the counter i is the true data rate of the received data, there is a strong possibility that the calculated remainder is 0; and when the data rate Ri is not the true data rate of the received data, there is a strong possibility that the remainder is not 0.

The CRC decoder 33 notifies the data rate detection portion 43 of the calculated remainder, as the CRC calculation result.

In step S7, the data rate detection portion 43 judges whether or not there exists an error in the received data, based on the CRC calculation result from the CRC decoder 33. That is, a judgment is made as to whether there exists an error in the received data based on the CRC calculation results for the case in which the data rate of the received data is the data rate Ri indicated by the value of the counter i at this time. If the CRC calculation result is not 0 (if the data rate Ri is not the true data rate), it is judged that an error exists; if the CRC calculation result is 0 (when there is a possibility that the data rate is the true data rate), it is judged that an error does not exist.

In step S7, when it is judged that an error has not occurred, processing proceeds to step S8, and the data rate detection portion 43 judges whether or not the S value computed in step S14 is equal to or less than the value of register Smin. The value D is initially set as the register Smin, and so an S value which initially results in a "YES" judgment in step S4 is of course equal to or less than the value of the register Smin.

In step S8, when the S value has been judged to be equal to or less than the value of the register Smin, processing proceeds to step S9, and the data rate detection portion 43 replaces the value of the register Smin with the S value just calculated. That is, the judgment in step S8 is a judgment as to whether the S value just calculated is the smallest among the S values calculated thus far.

The data rate detection portion 43 also replaces the value of the register Tr with the value of the counter i at this time.

When in step S4 the S value is judged to be equal to or less than the threshold D, when in step S7 it is judged that an error exists, when in step S8 it is judged that the S value is judged not to be equal to or less than the value of the register Smin, or when in step S9 the values of the register Smin and of the register Tr are replaced, processing proceeds to step S10.

In step S10, the data rate detection portion 43 judges whether or not the value of the counter i is the maximum value (4) or not; when judged not to be the maximum value, processing proceeds to step S11, the value of the counter i is incremented by 1, processing returns to step S13, and subsequent processing is executed.

When in step S10 the value of the counter i is judged to be the maximum value, processing proceeds to step S12, and the data rate detection portion 43 detects the data rate Ri identified by the value of the register Tr as the true data rate of the received data. The data rate detection portion 43 then controls the Viterbi decoding portion 42 to cause the decoded data at the detected data rate Ri to be output. Then processing ends.

As explained above, by performing reception processing in the reception device of this embodiment, there is the advantage that the S value necessary for data rate detection of received data can be obtained through simple processing. That is, in the prior art it was necessary to perform the complicated computations indicated by equation (1) to obtain the S value; however, in this embodiment, through normalization processing by the normalizer 41 and subtraction of the smallest path metric by the Viterbi decoding portion 42, the S value can be obtained as the zero-state path metric after subtraction of the smallest metric supplied by the Viterbi decoding portion 42, so that the amount of calculation for data rate detection can be reduced.

Figure 8:
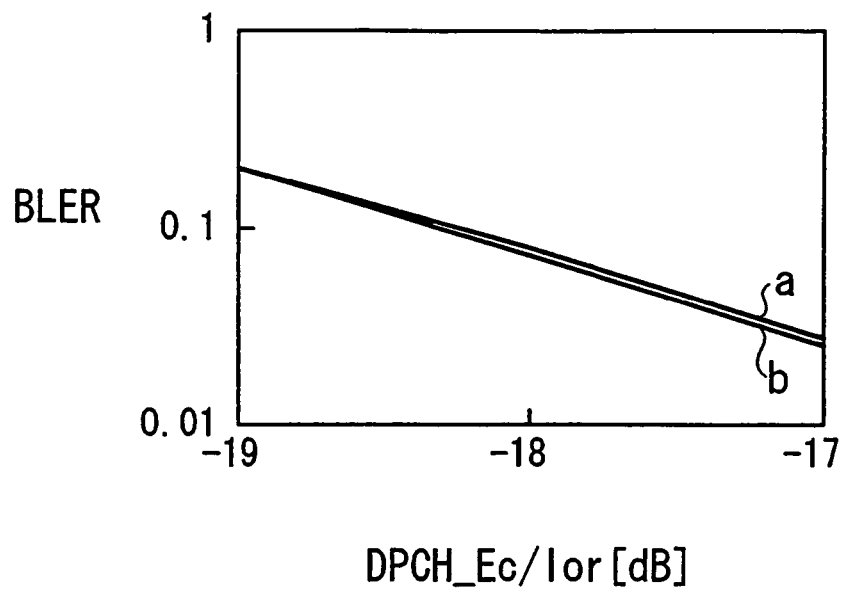
FIG. 8 is a characteristic diagram showing one example of the block error rate (BLER) according to an embodiment of the present invention.

There is almost no difference in the data rate detection ability of the processing of this embodiment (equation (2)) and conventional processing (equation (1)). FIG. 8 plots the block error rate (BLER) along the vertical axis and the transmission power from a base station along the horizontal axis, as an example measured in a 240 Hz fading state. Here the block error rate is the probability of failure of data rate detection processing with the register Tr left at the initial value of 0. The characteristic a is the S value error rate computed using the processing of this embodiment (equation (2)); the characteristic b is the S value error rate computed using conventional processing (equation (1)). There is almost no difference between the two characteristics.

Figure 9:
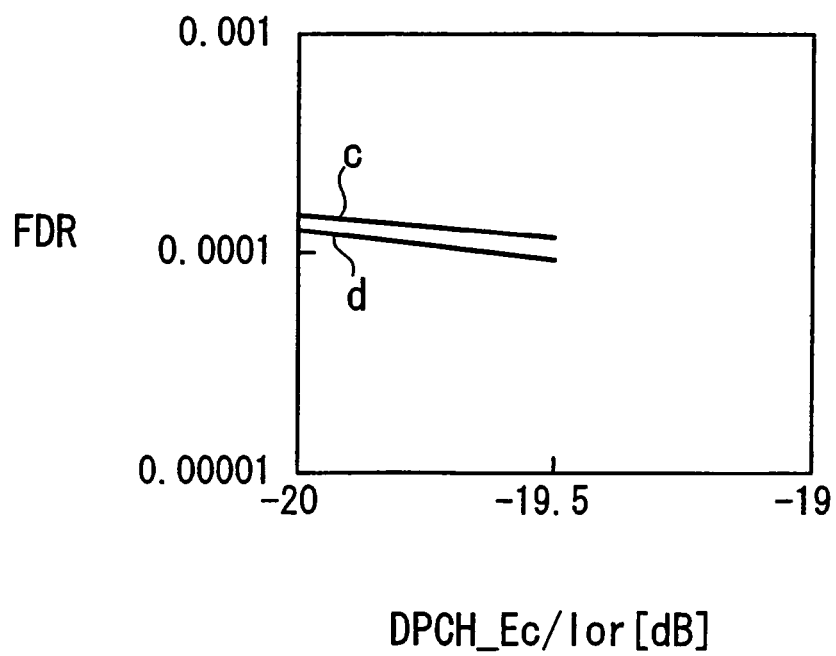
FIG. 9 is a characteristic diagram showing one example of probabilities that the transmission data rate and detected data rate are different, according to an embodiment of the present invention.

FIG. 9 plots the FDR (Fault Detection Rate) along the vertical axis and the transmission power from the base station along the horizontal axis, as an example measured in a 240 Hz fading state. The FDR is the probability that the transmission data rate and the detected data rate are different. However, the case in which the value of the register Tr remains at the initial value of 0 is excluded. The characteristic c is the S value error rate computed using the processing of this embodiment (equation (2)); the characteristic d is the S value error rate computed using conventional processing (equation (1)). In this case also, there is almost no difference between the characteristics.

As a result of the processing of the normalizer and subtraction of the smallest path metric in the Viterbi decoding portion as in this embodiment, there is some increase in the scale of the circuitry of these portions; however, the scale of the circuitry for computation of the S value is greatly reduced.

By setting an appropriate value for the parameter A in the normalizer, the dynamic range can be reduced in the later-stage Viterbi decoding portion. Without a normalizer, it would be necessary to secure a broad dynamic range accommodating all possible input ranges. By further performing quantization and limiting in the course of this processing, the data bit width can also be reduced, and so the circuit scale of the Viterbi decoding portion 42 can be further decreased.

The series of processing explained thus far can be implemented in hardware, but can also be realized in software. When realizing the series of processing in software, a program comprising the software is installed in a computer or other data processing equipment, and by executing the program on the computer or similar, the above-described reception device 4 is functionally realized.

Figure 10:
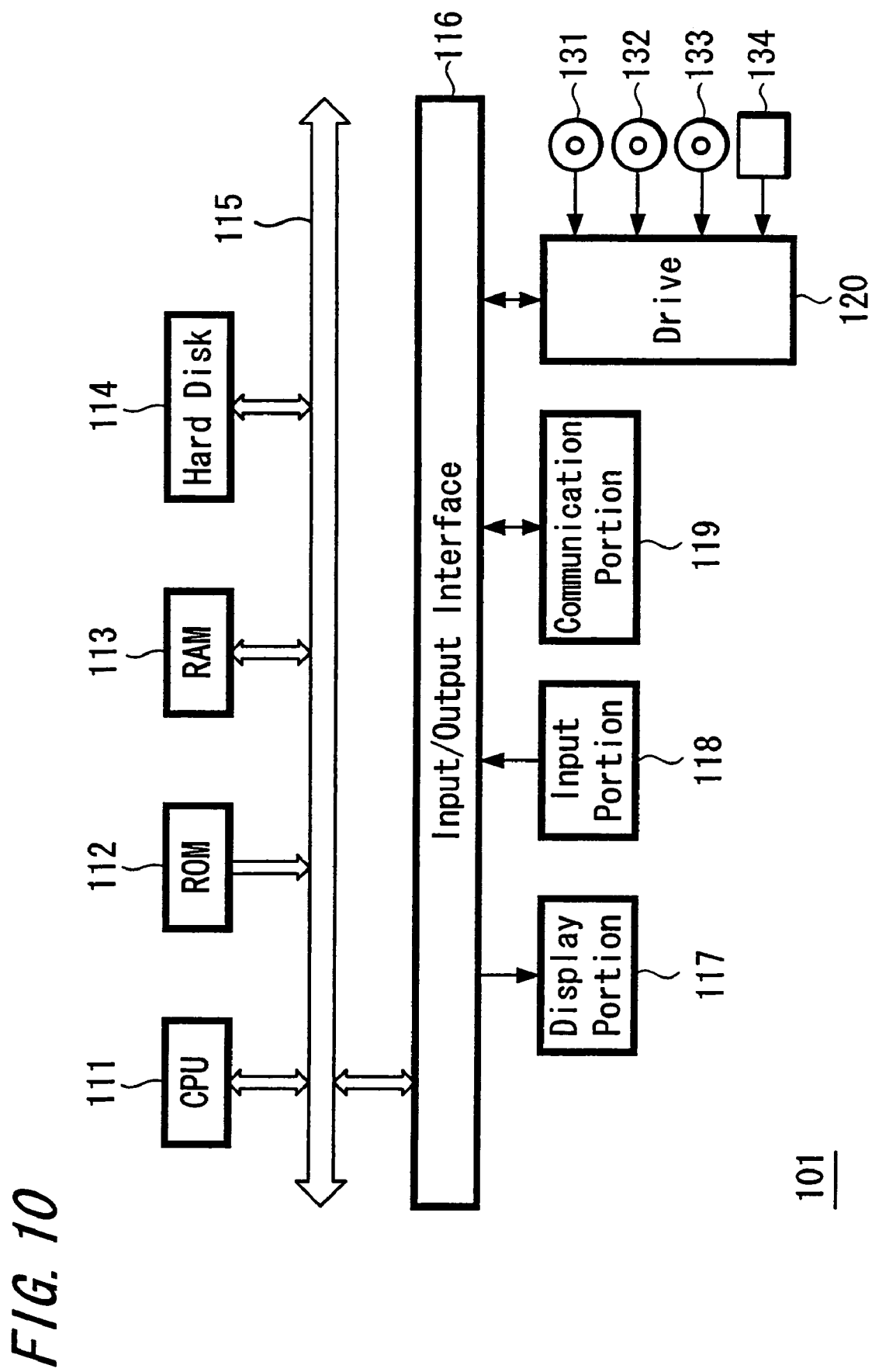
FIG. 10 is a block diagram showing one example of a computer device.

FIG. 10 is a block diagram showing an example of the configuration of a computer 101 functioning as a reception device 4 similar to that described above. An input/output interface 116 is connected via a bus 115 to a CPU (Central Processing Unit) 111, and upon input of an instruction by the user from the input portion 118 via the input/output interface 116 using a keyboard, mouse or similar, the CPU 111 loads into RAM (Random Access Memory) 113 and executes a program stored in, for example, ROM (Read-Only Memory) 112, a hard disk 114, or a magnetic disc 131, optical disc 132, or magneto-optical disc 133 loaded into a drive 120, or in semiconductor memory 134 or other recording media. By this means, the various processing described above (for example, the processing indicated in the flowchart of FIG. 7) is performed. Further, the CPU 111 outputs processing results via, for example, the input/output interface 116, to a LCD (Liquid Crystal Display) or other display portion 117 as necessary. The program can be stored in advance on the hard disk 114 or in ROM 112 and supplied integrally with the computer 101 to a user; or can be supplied in packaged media such as a magnetic disk 131, optical disc 132, magneto-optical disc 133, semiconductor memory 134 or similar; or can be supplied to the hard disk 114 from a satellite, network or similar via the communication portion 119.

In this specification, the steps describing a program to be supplied using recording media include, in addition to processing performed in time series following the order described, processing not necessarily in time series, and also processing executed in parallel or individually.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A signal processing device performing maximum-likelihood decoding of data transmitted at an arbitrary data rate among a plurality of predetermined data rates after error detection coding and error correction coding, comprising:

normalization means for calculating the average value of received data and normalizing the received data using the calculated average value;

maximum-likelihood decoding means for selecting in a predetermined order a plurality of items of the data among the output of the normalization means and performing maximum-likelihood decoding, considering the rate of the data to be a selected data rate;

computation means for subtracting, from predetermined metrics obtained by the maximum-likelihood decoding processing, the smallest metric thereamong;

judgment means for judging the correct data rate, based on state 0 metrics for each rate obtained as a result of computation by the computation means and on error detection results; and, output means for outputting decoded data at the rate judged to be correct by the judgment means, wherein in calculation of the average value of received data by the normalization means, the average value is calculated for the absolute values of data from the leading bit until the end position of the tail bit that is the shortest data length at the data rate, and each of the input data items is divided by the calculated average value and is further multiplied by a predetermined constant.

2. A computer readable medium encoded with executable instruction that when executed by a computer device perform a signal processing method, in which maximum-likelihood decoding is performed on data transmitted at an arbitrary data rate among a plurality of predetermined data rates after error detection coding and error correction coding, the method comprising the steps of:

calculating the average value of received data and normalizing the received data using the calculated average value;

selecting in a predetermined order a plurality of items of the data among the output of the normalization step and performing maximum-likelihood decoding, considering the rate of the data to be a selected data rate;

subtracting, from predetermined metrics obtained by the maximum-likelihood decoding step, the smallest metric thereamong;

judging the correct data rate, based on state 0 metrics for each rate obtained as a result of computation by the computation step and on error detection results; and, outputting decoded data at the rate judged to be correct by the judgment steps, wherein in calculation of the average value of received data in the normalization step, the average value is calculated for the absolute values of data from the leading bit until the end position of the tail bit that is the shortest data length at the data rate, and each of the input data items is divided by the calculated average value and is further multiplied by a predetermined constant.

* * * * *